US007441366B2

(12) United States Patent
Van Houten, II et al.

(10) Patent No.: US 7,441,366 B2
(45) Date of Patent: Oct. 28, 2008

(54) CONTAINER DECOY

(76) Inventors: Richard D. Van Houten, II, 1067
Westward La., Costa Mesa, CA (US)
92627; Gary J. Van Houten, 457
Autumn Dr., Nampa, ID (US) 83686

( * ) Notice: Subject to any disclaimer, the term of this patent is extended or adjusted under 35 U.S.C. 154(b) by 0 days.

(21) Appl. No.: 11/651,215

(22) Filed: Jan. 10, 2007

(65) Prior Publication Data
US 2008/0163537 A1 Jul. 10, 2008

(51) Int. Cl.
*A01M 31/06* (2006.01)
(52) U.S. Cl. .............................. 43/3; 43/2; 206/315.11; D9/602; D9/604; D22/125
(58) Field of Classification Search ........................ 43/2, 43/3, 1, 54.1; 206/315.11; 224/920; D22/125, D22/134, 136, 148; D9/604, 603, 602, 601
See application file for complete search history.

(56) References Cited

U.S. PATENT DOCUMENTS

| D4,773 | S | * | 4/1871 | Atterbury | D9/602 |
|---|---|---|---|---|---|
| D6,159 | S | * | 10/1872 | Dawes | D9/609 |
| D12,404 | S | * | 8/1881 | Lackner | D9/604 |
| D12,887 | S | * | 4/1882 | Barker | D9/604 |
| 395,189 | A | * | 12/1888 | Stanton | 43/2 |
| 403,595 | A | * | 5/1889 | Jencks | 43/3 |
| D19,697 | S | * | 3/1890 | Mann | D9/604 |
| 1,290,056 | A | * | 1/1919 | Bintliff | 43/1 |
| 1,447,402 | A | * | 3/1923 | Anderson | 43/54.1 |
| D72,622 | S | * | 5/1927 | Grunberg | D9/604 |
| D75,953 | S | * | 8/1928 | Charpentier | D9/604 |
| D80,843 | S | * | 4/1930 | Krumm | D9/604 |
| D89,337 | S | * | 2/1933 | Gorton, Jr. | D9/604 |
| 2,159,233 | A | * | 5/1939 | Stannard | 43/54.1 |
| D122,715 | S | * | 9/1940 | Stavenhagen | D7/539 |
| D151,115 | S | * | 9/1948 | Zipser | D7/556 |
| 2,460,128 | A | * | 1/1949 | Greenleaf | 43/3 |
| 2,480,390 | A | * | 8/1949 | Thompson | 43/3 |
| 2,501,517 | A | * | 3/1950 | Honald | 43/2 |
| D159,643 | S | * | 8/1950 | Kelly et al. | D7/506 |
| 2,555,073 | A | * | 5/1951 | Zdankoski | 43/54.1 |
| 2,820,547 | A | * | 1/1958 | Nelson | 43/3 |
| 2,855,712 | A | * | 10/1958 | Diletto | 220/376 |
| 2,899,103 | A | * | 8/1959 | Ebert | 43/54.1 |
| D194,714 | S | * | 2/1963 | Paganelli, Sr. et al. | D9/604 |
| D204,211 | S | * | 3/1966 | Fahlgren | D9/604 |
| D205,480 | S | * | 8/1966 | Thomte | D9/604 |
| D206,496 | S | * | 12/1966 | Giessinger | D9/604 |
| D210,866 | S | * | 4/1968 | Wickham | D9/604 |
| 3,408,763 | A | * | 11/1968 | Rudolph | 43/3 |
| 3,628,843 | A | * | 12/1971 | Wynne et al. | 206/315.11 |

(Continued)

OTHER PUBLICATIONS

Cabela's Camo Marine Dry Boxes, pp. 1-2.*

(Continued)

*Primary Examiner*—Darren W Ark

(57) ABSTRACT

A container decoy apparatus (10) for storing items and attracting wild game.

The container decoy apparatus (10) includes at least two portions, when closed form a three-dimensional animal shape.

The portions are combined by a hinge means (14) for opening and closing the container decoy apparatus (10).

The portions are controllably coupled (13), when coupled the container decoy (10) becomes a decoy for attracting wild game and is also used for storing items.

1 Claim, 6 Drawing Sheets

U.S. PATENT DOCUMENTS

| | | | | |
|---|---|---|---|---|
| 3,678,611 A * | 7/1972 | Files | | 43/54.1 |
| 4,023,304 A * | 5/1977 | Singer | | 43/54.1 |
| 4,073,397 A * | 2/1978 | Snodgrass | | 43/3 |
| D253,573 S * | 12/1979 | Edwards | | D7/303 |
| 4,356,928 A * | 11/1982 | Stafford | | 43/3 |
| 4,366,641 A * | 1/1983 | Price et al. | | 43/54.1 |
| 4,372,073 A * | 2/1983 | Goldman | | 224/920 |
| D270,518 S * | 9/1983 | Duering | | D9/604 |
| D272,579 S * | 2/1984 | Snyder | | D9/604 |
| 4,539,772 A * | 9/1985 | Forbes et al. | | 43/3 |
| 4,581,837 A * | 4/1986 | Powlus | | 43/2 |
| 4,651,458 A * | 3/1987 | Lanius | | 43/3 |
| 4,658,530 A * | 4/1987 | Ladehoff | | 43/3 |
| 4,691,463 A * | 9/1987 | DeKezel et al. | | 43/3 |
| D292,875 S * | 11/1987 | Ladson | | D9/604 |
| 4,819,805 A * | 4/1989 | Sen | | D9/604 |
| 4,829,694 A * | 5/1989 | Oasheim | | 43/2 |
| D306,966 S * | 4/1990 | Ferrero | | D9/604 |
| 5,003,718 A * | 4/1991 | Lenert et al. | | 43/3 |
| 5,011,013 A * | 4/1991 | Meisner et al. | | 206/373 |
| D319,016 S * | 8/1991 | Kahl | | D9/424 |
| 5,075,999 A * | 12/1991 | Fredericks | | 43/2 |
| D332,202 S * | 1/1993 | Mosa | | D7/392.1 |
| 5,231,780 A * | 8/1993 | Gazalski | | 43/3 |
| 5,246,020 A * | 9/1993 | Wu | | D9/604 |
| D339,914 S * | 10/1993 | Fredericks | | D3/260 |
| D355,849 S * | 2/1995 | Trower et al. | | D9/424 |
| 5,608,983 A * | 3/1997 | Adams | | 43/3 |
| 5,678,346 A * | 10/1997 | Kellett | | 43/2 |
| 5,787,632 A * | 8/1998 | Kraut | | 43/2 |
| 5,903,997 A * | 5/1999 | Jacob | | 43/2 |
| D425,176 S * | 5/2000 | Besecke | | D23/212 |
| 6,170,188 B1 * | 1/2001 | Mathews | | 43/3 |
| 6,296,005 B1 * | 10/2001 | Williams et al. | | 43/2 |
| 6,321,480 B1 * | 11/2001 | Solomon | | 43/3 |
| 6,339,894 B1 * | 1/2002 | Solomon | | 43/3 |
| 6,343,432 B1 * | 2/2002 | Brown et al. | | 43/3 |
| 6,408,559 B2 * | 6/2002 | Mathews | | 43/3 |
| D460,217 S * | 7/2002 | Shih | | D9/451 |
| 6,415,807 B1 * | 7/2002 | Maher | | 43/2 |
| 6,493,980 B1 * | 12/2002 | Richardson et al. | | 43/3 |
| 6,553,708 B1 * | 4/2003 | Wolfe | | 43/3 |
| 6,560,912 B1 * | 5/2003 | Achepohl | | 43/3 |
| 6,601,333 B2 * | 8/2003 | Cicoff et al. | | 43/3 |
| 6,675,522 B2 * | 1/2004 | Mathews | | 43/3 |
| 6,907,688 B2 * | 6/2005 | Brint | | 43/2 |
| 6,920,977 B1 * | 7/2005 | VanSkiver et al. | | 206/315.11 |

OTHER PUBLICATIONS

Avery Decoy Bags & Accessories, pp. 1-4.*
Avery Hunting Bags, Packs and Cases, pp. 1-7.*
Mad Dog Gear—Packs, Bags, Gun Cases, Coolers—Part 1, pp. 1-2.*
Mad Dog Gear—Packs, Bags, Gun Cases, Coolers—Part 2, pp. 1-2.*
Mad Dog Gear—Packs, Bags, Gun Cases, Coolers—Part 3, p. 1.*

* cited by examiner

CONTAINER DECOY

BACKGROUND

1. Field of Invention

This invention relates to storage containers and more particularly to waterfowl storage containers for storing of waterfowl gear.

2. Description of Prior Art

Waterfowl containers have been designed to hold various items that a person would need on a waterfowl hunting trip. Most waterfowl containers are cube or cylinder shaped. Examples of such designs are described in the 2006 Cabela's Waterfowl Catalog page 78 "Camo Marine Dry Boxes", page 92 and page 93. Respectively, they describe means for storing items. A major drawback for all of the proposed designs is when you have limited space or cover and have to hide the waterfowl container outside your blind. Normally you conceal the waterfowl container with a camouflage material or natural foliage. The reason for the concealment is so the targeted waterfowl does not see the container and is scared away.

OBJECTS AND ADVANTAGES

In general, the object of this invention is to provide a container in the shape of a waterfowl for storing items; and to be used as a decoy for attracting the targeted waterfowl.

REFERENCE NUMERALS IN DRAWINGS

Figure 1:
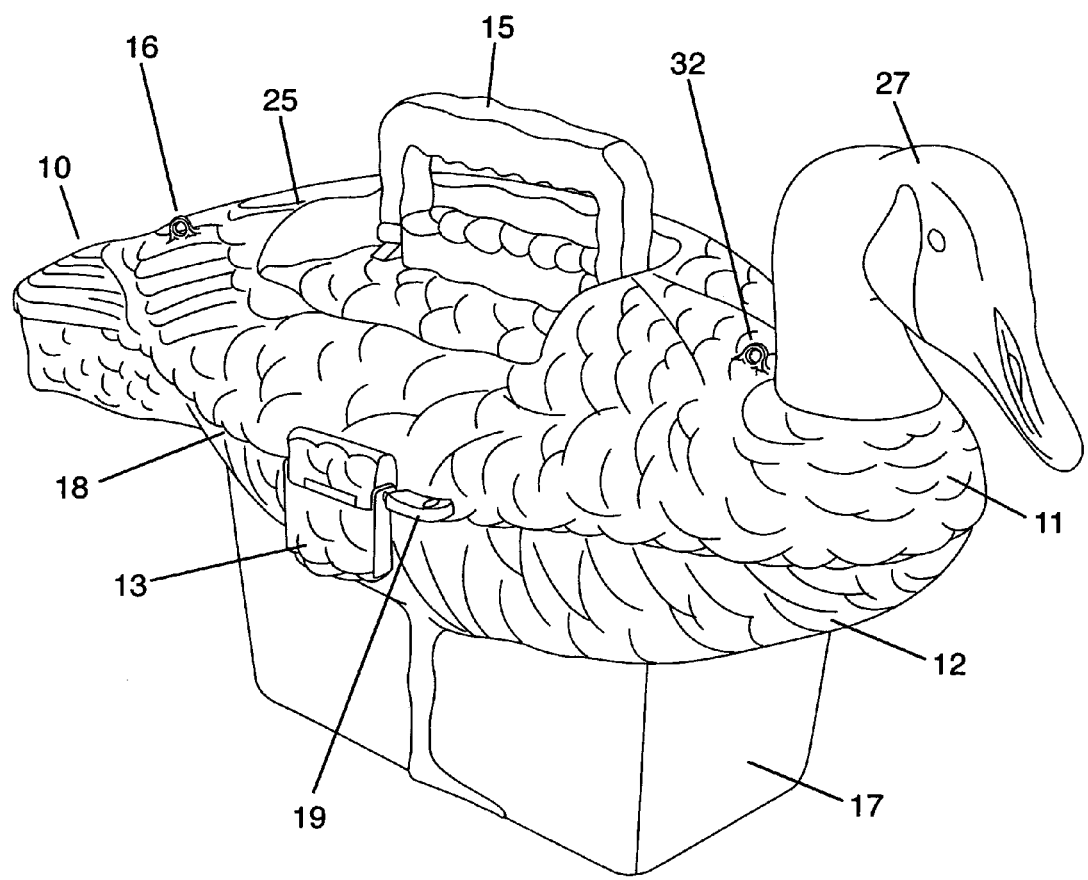
FIG. 1 is an elevated front ¾ view of the container decoy.

| | |
|---|---|
| 10 container decoy apparatus | 11 upper portion |
| 12 lower portion | 13 coupling device |
| 14 hinge means | 15 handle |
| 16 rear eyelet | 17 additional container shape |
| 18 asymmetrical edge | 19 safety eyelet |
| 20 rear storage section | 21 center storage section |
| 22 front storage section | 23 storage tray |
| 24 contoured side of tray | 25 recess area for handle |
| 26 extended upper tray ends | 27 head |
| 28 receiver for moveable head | 29 rear storage divider |
| 30 front storage divider | 31 storage tray handle |
| 32 front eyelet | |

SUMMARY OF THE INVENTION

Among the many objectives of this invention is the provision of a storage container.

A further objective of this invention is the provision of a hunting decoy.

Yet a further objective of this invention is the provision of a container that is used to attract waterfowl.

A still further objective of this invention is the provision of a hunting decoy and its contents is easily transported.

Another objective of this invention is the provision of a hunting decoy that is easily retrieved.

These and other objectives of the invention (which other objectives become clear by consideration of the specifications, claims and drawings as a whole) are met by providing a container, that is a hunting decoy.

DESCRIPTION OF THE PREFERRED EMBODIMENT

With a container decoy of this invention, a three-dimensional animal shape can support a stationary head or moveable head assembly. Within a body portion, a top or an exterior part there of may contain a stationary head or a receiver for a moveable head assembly. More particularly, the container decoy has at least two concave body portions. Thus the interior of the concave body portions is to be used for storing items. The exterior of the body portions contain an appropriate decoration to mimic the targeted animal, such as a duck or goose.

The body portions are adapted to work together by a hinge means, to open and close the container decoy. One preferred form of the hinge means is to have extruding sections on the body portions that interlock to form the hinge.

Another preferred form of the hinge means is to have extruding sections on the body portions that are connected using a rod to form the hinge.

The portions are controllably coupled using a molded coupling device.

Another preferred form of controllably coupling the body portions is to use a molded piece in conjunction with a shaped rod for coupling.

Clearly the head portion and the body portions are colored appropriately to resemble any waterfowl being sought or hunted. Furthermore, the appropriate size and shape of body portions and head can be made to resemble any fowl. It is clear that the concave structure of the body portions and the movability of the head combine to provide great flexibility in the container decoy use or permit a variety of applications.

These container decoys may be formed from any suitable material. The main requirement for material is that it is semi-rigid, receives appropriate decoy colors, and provides an appropriate decoy shape. Thus, the container decoys can be made from wood, synthetic type resins or plastic type materials, or combinations thereof. The resins or plastics may be solid or foamed.

Referring now to FIG. 1, a container decoy 10 may be used alone or in combination with other decoys. The container decoy 10 has at least two portions 11 and 12 to form the three-dimensional animal shape. On the end of one portion 11 can be a stationary or movable head 27. In the center of portion 11 is a handle means 15 for ease of transportation. Adjacent to the handle means 15 are a rear eyelet 16 and a front eyelet 32 for attaching a strap for ease of transportation. In portion 11 there is a recessed area 25 for concealment of the handle means 15 in the down position. The lower circumference of portion 11 has an asymmetrical edge 18 slightly larger than the top circumference of portion 12 so the portions join together to form the three-dimensional animal shape 10. Portion 12 has an additional container shape 17 which is colored to match suited natural foliage.

Portion 12 has a molded and colored coupling mechanism 13 to secure portion 11 to portion 12. Portion 11 and portion 12 have a safety eyelet 19 to be used in conjunction with a locking device to discourage someone from gaining access to the contents of the container decoy 10.

Figure 2:
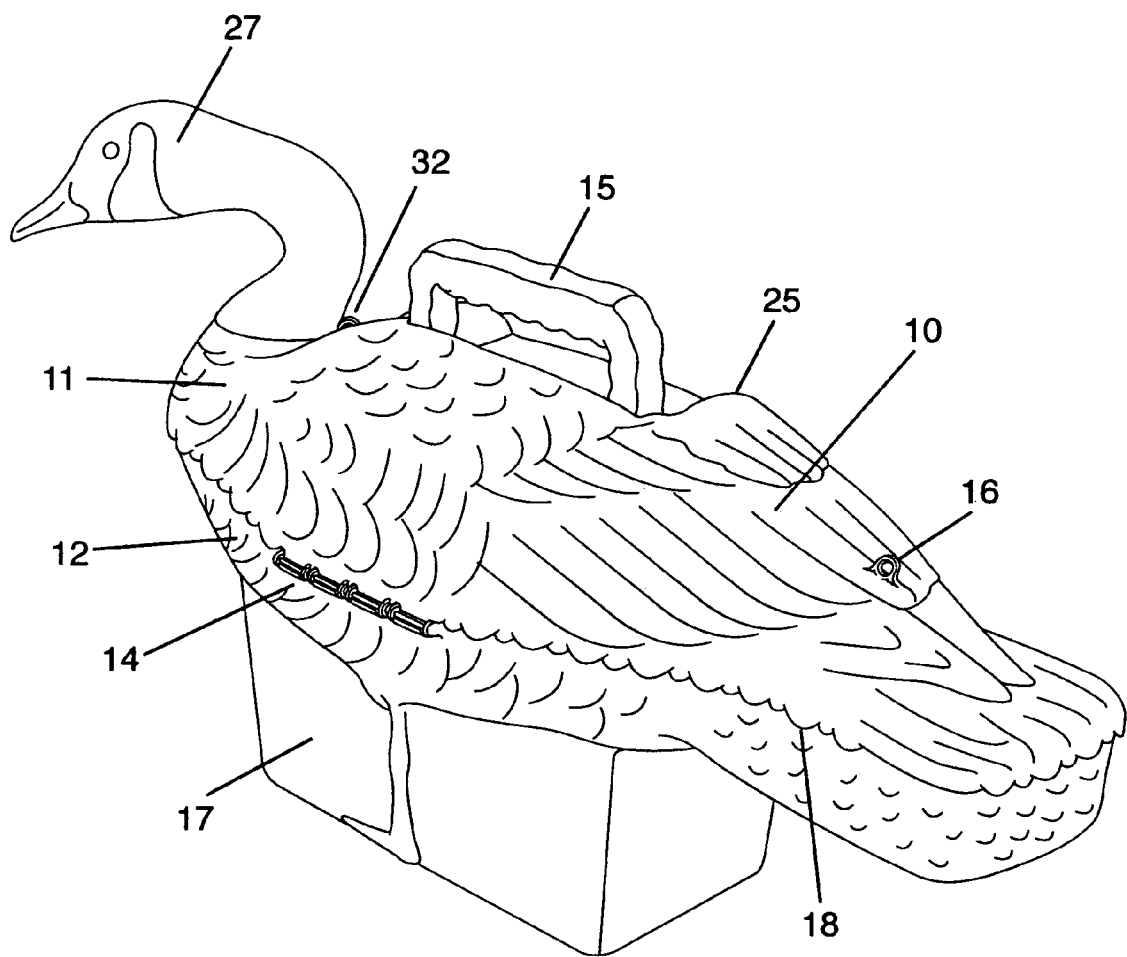
FIG. 2 is an elevated rear ¾ view of the container decoy.

Adding FIG. 2, to the discussion, portion 11 and portion 12 have a hinge means 14 for opening and closing the container decoy 10.

Figure 3:
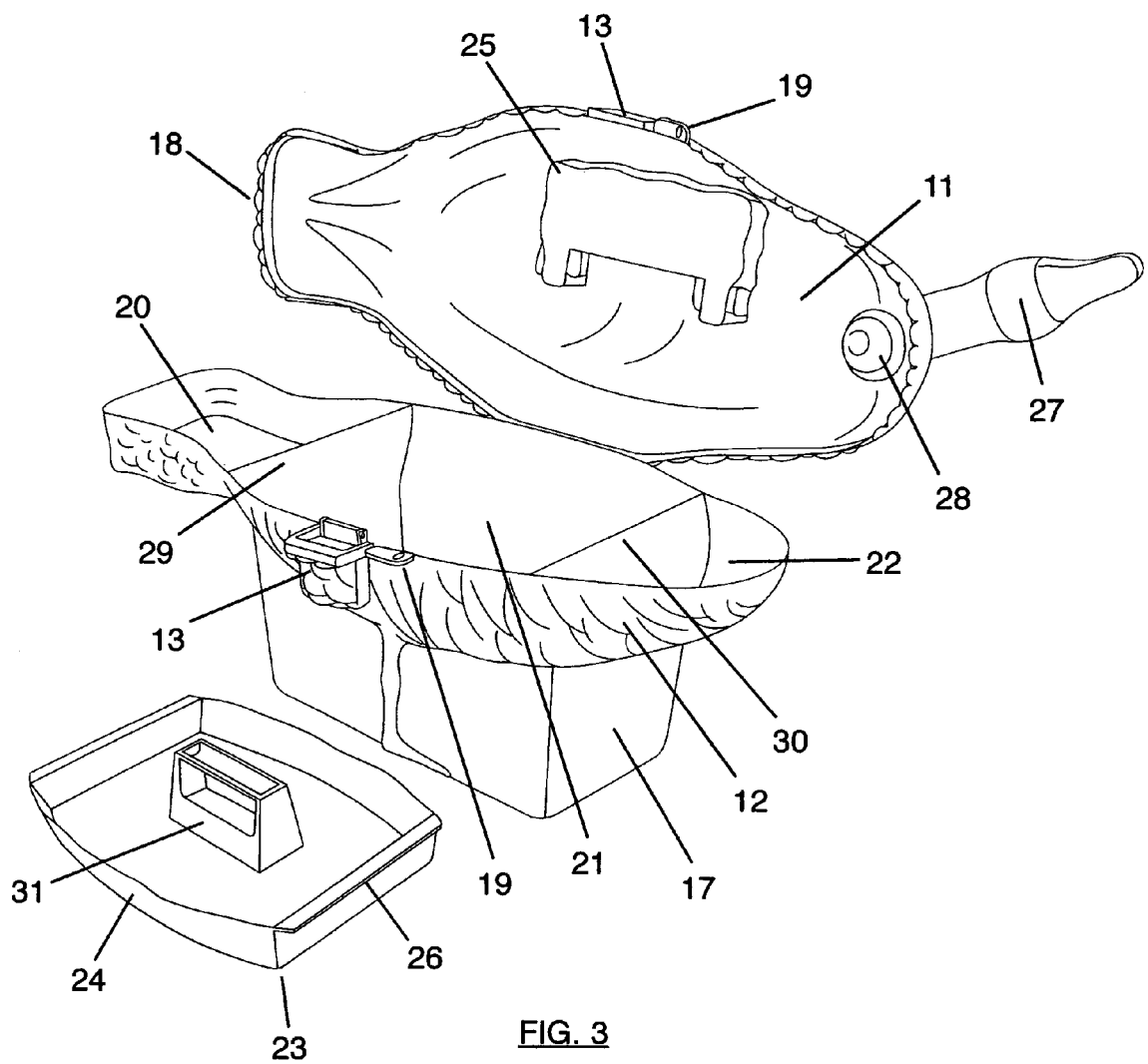
FIG. 3 is an elevated front ¾ view of the open container decoy and interior tray.
Figure 4:
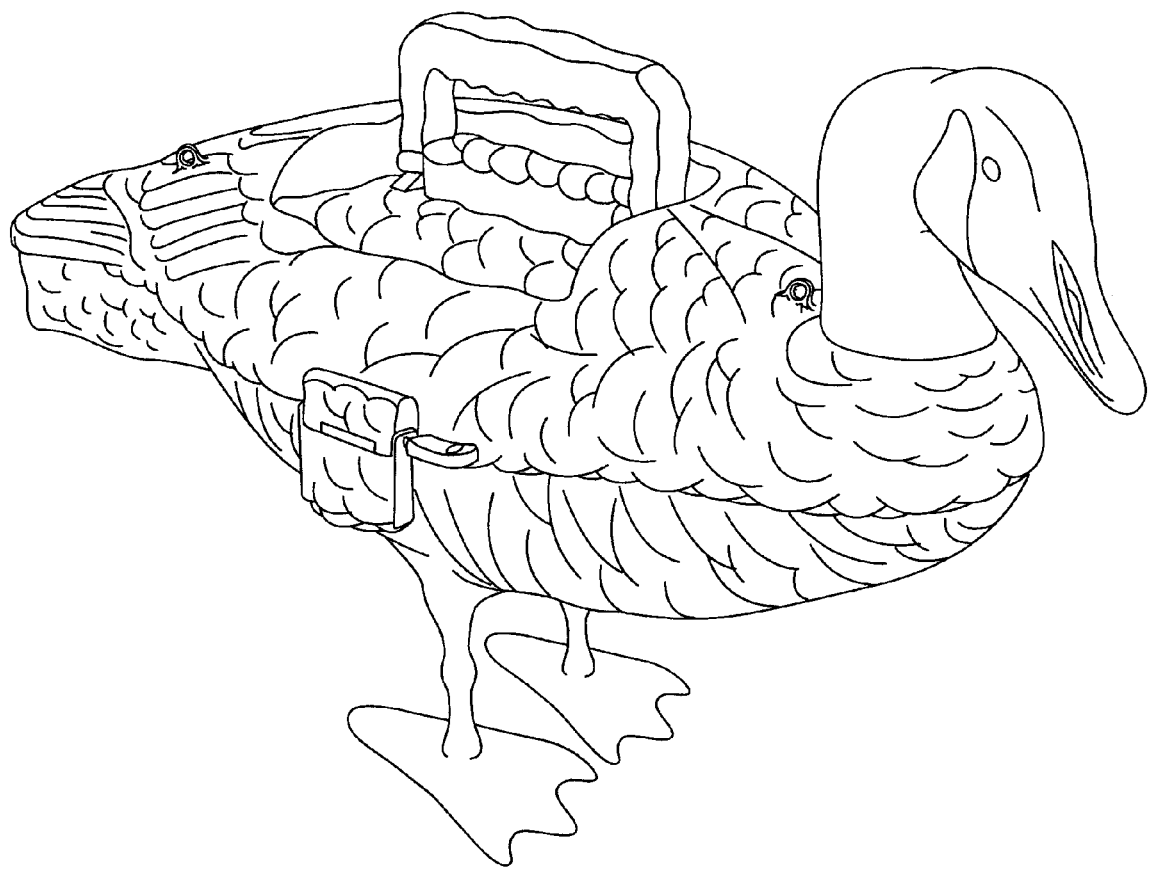
FIG. 4 is an elevated front ¾ view of a modified container decoy.
Figure 5:
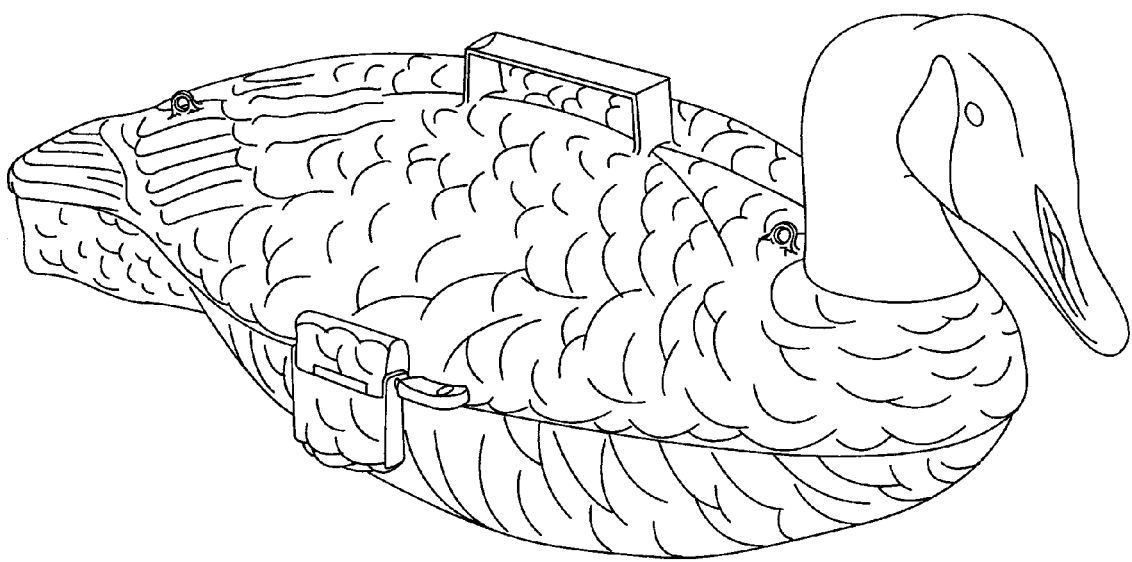
FIG. 5 is an elevated front ¾ view of another modified container decoy.
Figure 6:
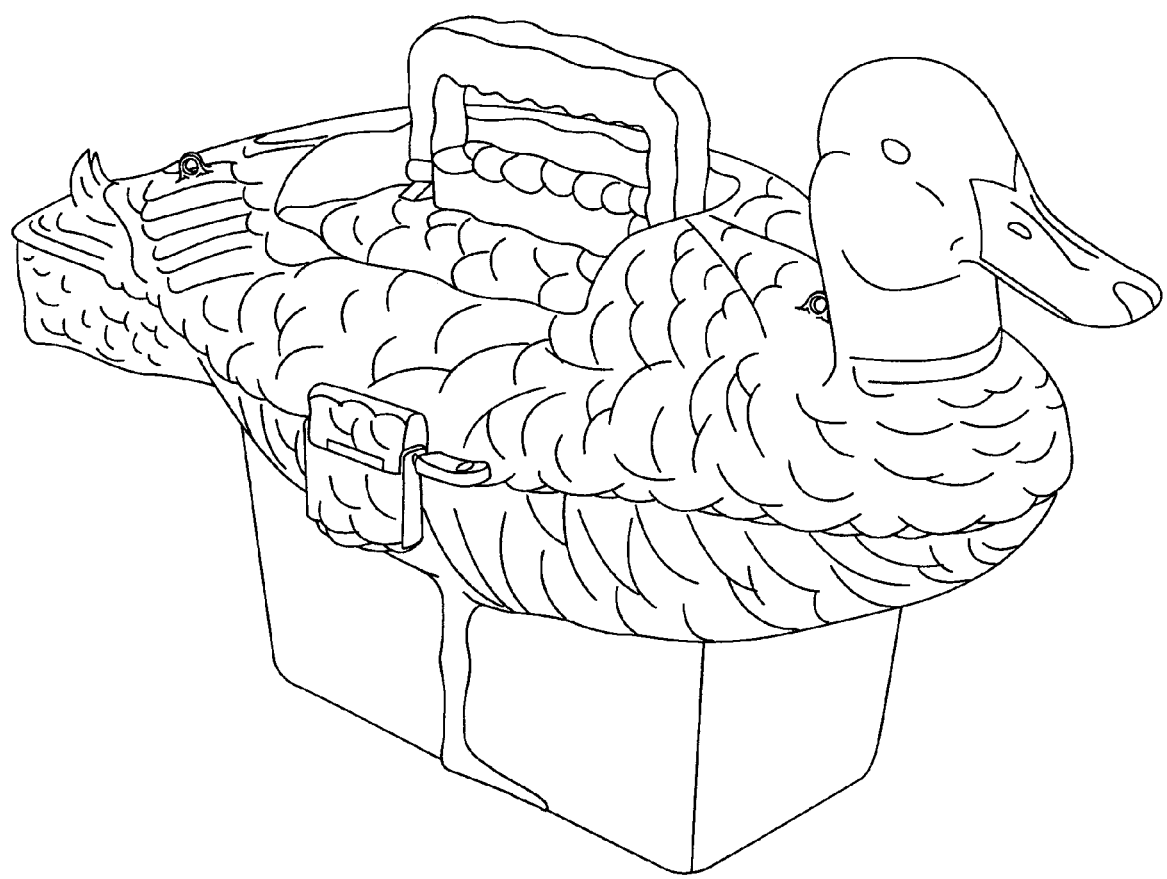
FIG. 6 is an elevated front ¾ view of yet another modified container decoy.

Adding FIG. 3, to the consideration, it becomes clear that the top circumference of portion 12 fits into the bottom asymmetrical circumference 18 of portion 11. Portion 11 shows a receiver 28 for a moveable head 27. Portion 12 shows a rear storage section 20, a center storage section 21 and a front storage section 22. A storage tray 23 fits into the center storage section 21. The storage tray 23 is lifted by using a handle means 31. The storage tray 23 has contoured sides 24 to fit the inner shape of the center storage section 21. The storage tray 23 shows extended upper tray ends 26 that rest on a rear storage divider 29 and front storage divider 30.

Although an exemplary embodiment of the invention has been described in detail above, those skilled in the art will readily appreciate that modifications and variations are possible without materially departing from the novel teachings and advantages of this invention. Accordingly, all such modifications and variations are intended to be included within the scope of this invention as defined in the following claims.

We claim:

1. A container decoy, comprising:

an upper portion and a lower portion with concave inner surfaces which together represent a bird shape having a head simulating a head of a bird and tail simulating a tail of the bird opposed to each other, a longitudinal axis of said container decoy being defined between said head and tail;

handle means for more easily transporting and retrieving the container decoy, said handle means being positioned on a top of said upper portion between said head and tail;

a front eyelet positioned on said top of said upper portion between said head and said handle means along said longitudinal axis, a rear eyelet positioned on said top of said upper portion between said tail and said handle means along said longitudinal axis, said front and rear eyelets for attaching a strap to more easily transport and retrieve said container decoy;

a tray for providing an additional storage area, said tray having a base, opposed end walls, and opposed sides which conform to asymmetrical inner sides of an upper part of said lower portion, said end walls and said sides extending upwardly from a periphery of said base and defining a tray compartment therebetween, said end walls having upper ends opposite said base, said upper ends of said end walls having tray ends extending transverse to said end walls away from said tray compartment, said tray ends resting on dividers located within said concave inner surface of said bottom portion when said tray is placed within said container decoy, said tray also having a handle extending upwardly from said base within said tray compartment;

hinge means for hingeably connecting said upper and lower portions so as to allow said upper and lower portions to assume open and closed positions and thus allow opening and closing of said container decoy, said hinge means located on one side of the container decoy, said upper and lower portions usable for placing and storing items within said concave inner surfaces when in the open position and usable as a decoy when in the closed position; and means for coupling said upper and lower portions together located on an other side of the container decoy opposite from said hinge means, whereby said container decoy can be secured in the closed position.

* * * * *